Inventor:
JOSEPH R. BURNS
BY Samuel ...
Attorney

Dec. 31, 1968 J. R. BURNS 3,419,851

CONTENT ADDRESSED MEMORIES

Filed Nov. 3, 1965 Sheet 2 of 4

Inventor:
JOSEPH R. BURNS
By [signature]
Attorney

Inventor:
JOSEPH R. BURNS
BY Samuel Cohen
Attorney

Inventor:
JOSEPH R. BURNS
BY [signature]
Attorney

United States Patent Office 3,419,851
Patented Dec. 31, 1968

3,419,851
CONTENT ADDRESSED MEMORIES

Joseph R. Burns, Trenton, N.J., assignor to Radio Corporation of America, a corporation of Delaware Filed Nov. 3, 1965, Ser. No. 506,245
6 Claims. (Cl. 340—172.5)

ABSTRACT OF THE DISCLOSURE

A digital manifestation is derived from each word stored in a content-addressed memory which manifestation is indicative of the degree of match of that word with a tag word. In response to these manifestations, words in the memory having any desired degree of match to the tag word are read out.

A content addresed memory, sometimes also known as an "associative" or "catalog" memory, is interrogated by applying the bit or bits of a "tag" word, sometimes also known as a "descriptor," to the memory. There may be no, one, or more than one word in the memory which correspond to the tag word. A memory word is said to correspond to or to be called for by a tag word when the bits in the memory word equal the bits in the same positions of the tag word.

The present invention is mainly concerned with the problem of determining, in the case in which there is no word in the memory corresponding to the tag word, the word or words which almost correspond to the tag word. This problem is sometimes known in the art as the "proximity match" problem. Known solutions require the use of complex analog circuits and are relatively slow and for these reasons are not entirely satisfactory.

An object of the present invention is to provide a solution to the proximity match problem which is efficient and which employs only digital techniques.

According to the present invention, a control word is derived from each word storage location which consists of bits of one value for each bit in a stored word which is not equal to the corresponding tag bit and bits of the other value for each other bit of the stored word. Control signals are produced from the control words to indicate the control words having a predetermined number of bits of said one value. In response to these control bits, the stored words from which the control words having said predetermined number of bits of said one value are derived, are read out in sequence.

The invention is discussed in greater detail below and is shown in the following drawings of which:

The blocks shown in the figures are electrical circuits which receive electrical signals indicative of binary digits (bits) and which produce output signals indicative of bits. The convention arbitrarily is adopted that a relatively high level signal represents a 1 and a relatively low level signal a 0. Further, to simplify the following discussion, rather than starting that a signal indicative of a binary digit is supplied to or received from a circuit, it is stated that a 1 or a 0 is applied to or received from a circuit.

Figure 1:
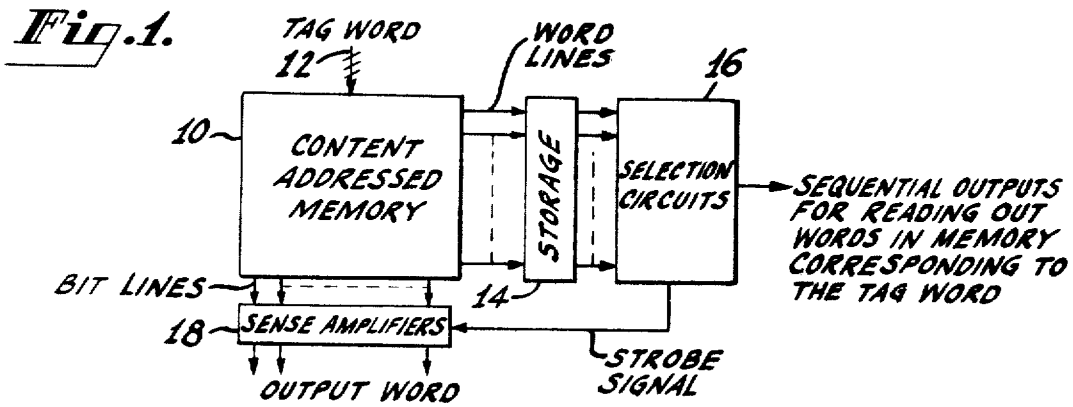
FIGURE 1 is a block circuit diagram of a prior art content-addressed memory system.

The prior art system of FIGURE 1 is capable of producing outputs indicative of more than one word stored in a content-addressed memory corresponding to a tag word. In the idiom of this art, the system of FIGURE 1 is capable of resolving "multiple matches," that is, the system permits the read out from the memory, in sequence, of all of the words which have bits of the same value as the tag bits in the same positions as the tag bits.

In the system of FIGURE 1, block 10 is a content-addressed memory. This memory may take any one of a number of different forms and, while the present invention does not depend for its operation on the particular structure of the content-addressed memory employed, typical examples of such memories are shown in application Ser. No. 213,339, and now issued as Patent No. 3,264,624 filed July 30, 1962 by H. Weinstein and in application Ser. No. 257,256, filed Feb. 8, 1963 by R. O. Winder and now issued as Patent No. 3,354,436. Both applications are assigned to the same assignee as the present invention.

In brief, the memory 10 of FIGURE 1 includes a plurality of storage elements arranged in columns and rows. The word lines of the memory are the row lines and the bit lines are the column lines. Each word in the memory may be made up of a plurality of bits, as for example, 28, 64 or some other larger number, depending upon the particular memory application involved. For the sake of the present discussion, it may be assumed that there are $m$ bits in each word, in which case there may be $2m$ column wires in the memory. In a practical memory, the total number of words stored by the memory may be of the order of one thousand or ten thousand, or some much larger number. For the sake of generality, it is assumed that there are $n$ words which can be stored in the memory and that there are $n$ word lines.

In the operation of the memory, a tag word is initially applied to bus 12. The tag word, in effect, asks the question: "Are there any words in the memory which have bits which correspond to the tag bits and are in the same position as the tag bits?" ("Are there any 'matches'?"). For example, the tag bits may represent the first, fourth and fifth characters in a license plate in which case the memory is asked to supply all the license plate numbers having these characters in these positions. The bus 12 to which the tag word is applied may have up to $2m$ lines (two lines per bit), where $m$ is the maximum number of bits in a word stored in the memory. For ease of illustration, the bus is illustrated as a single line crossed by short diagonal lines.

If there is a word in a particular row in the memory which corresponds to the tag word, a signal appears on that row line. If there is more than one word in the memory corresponding to the tag word, signals concurrently appear on more than one of the row lines. These concurrent signals must then be converted to sequential signals which are fed back to the content-addressed memory as sequential readout commands. The latter cause the words in the memory corresponding to the tag word to be read out, in sequence.

In the system of FIGURE 1, the concurrent signals on the word lines are applied to the set terminals of a storage means 14 such as a register. The storage elements of the register which are thereby set are hereafter termed "active" elements. A selection circuit 16 connected to the register 14 selects the active elements of the register, in sequence, and produces corresponding readout signals, also in sequence. For example, if the register is made up of $n$ flip-flops and the $2^0$, $2^4$ and $2^n$ flip-flops have been set (have been made active), the circuit 16 functions to select first the $2^0$ flip-flop, then to skip the $2^1$, $2^2$ and $2^3$ flip-flops and select the $2^4$ flip-flop, and then to next select the $2^n$ flip-flop.

Each time the circuit 16 selects a flip-flop, the circuit produces a memory readout signal consisting of a "strobe" signal for the sense amplifiers 18. For example, when the $2^0$ flip-flop (which may correspond to the first line of the content-addressed memory) is selected, a readout drive signal is applied to the first line of the content-addressed memory. This drive signal causes the bits in the word on the first line of the content-addressed memory to appear on the bit lines. Concurrently, each of the sense amplifiers 18 is strobed by the strobe signal so that an output word appears at the output of the respective sense amplifiers. After each word is read out of the memory, the flip-flop in register 14 associated with that word is reset.

Detailed showings of various selection circuits 16 and other circuits appear in the copending applications above.

Figure 2:
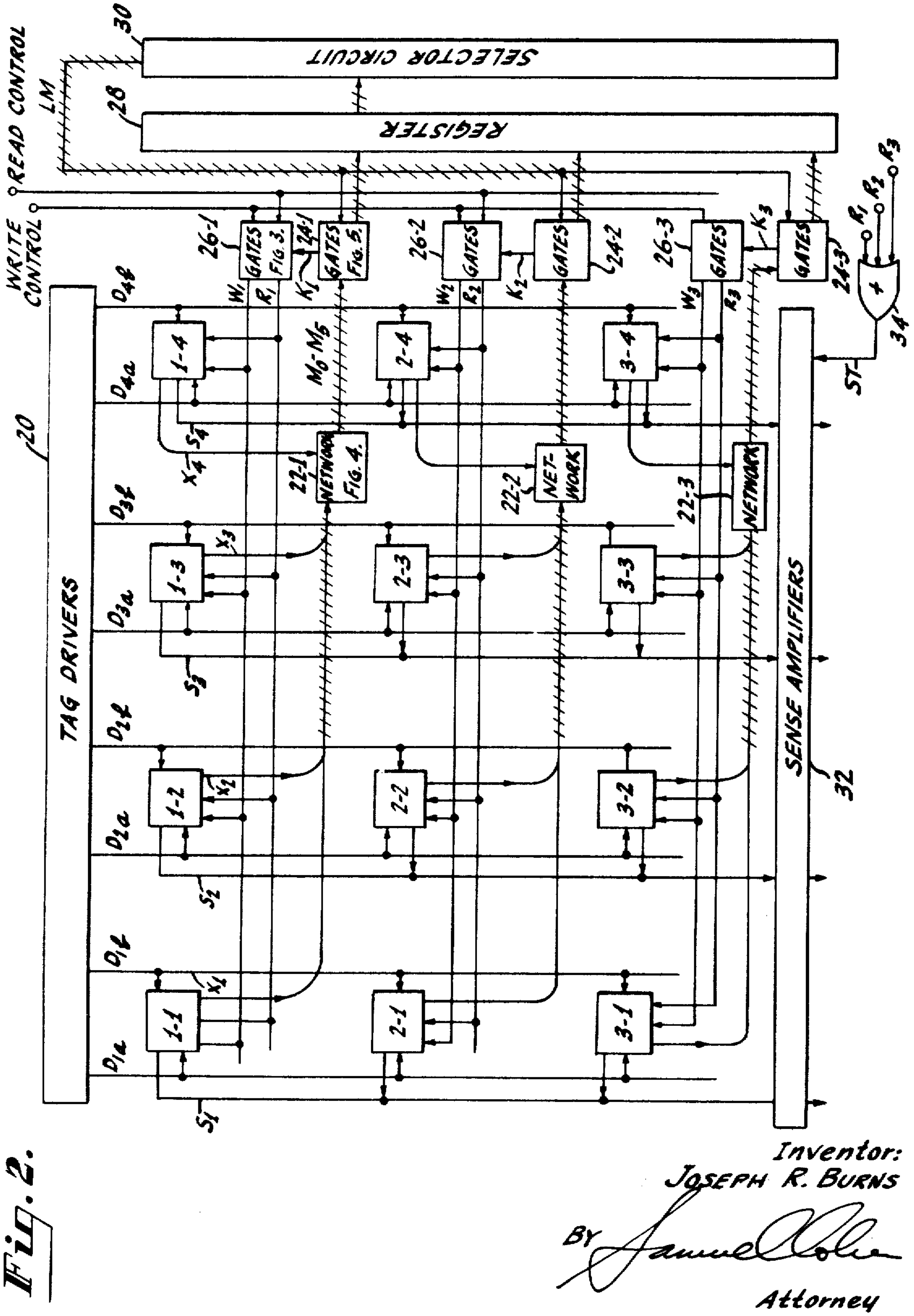
FIGURE 2 is a block circuit diagram of a content-addressed memory system according to the present invention.

The system of the present invention is shown generally in FIGURE 2. It includes circuits for resolving "matches" and "multiple matches." These are discussed first. It also includes circuits for retrieving from the memory certain words which do not "match" the tag word. These circuits are discussed later.

For purposes of the present explanation, the memory of FIGURE 2 is shown to have 3 rows and 4 columns. However, in practice, the memory may be much larger than this. Each block such as 1–1, 1–2 and so on represents a memory stage consisting of a memory element, namely, a set-reset flip-flop and certain logic stages associated with the memory element. A more detailed showing of a memory stage appears in FIGURE 3.

Information may be written into the memory by applying bits to the various column wires of the memory coincidently with a $W=1$ signal. Table I below shows the conventions which are employed. The value of the stored bit is unaffected by the input $D_a=D_b=0$. For this reason, this input is sometimes termed "don't care" or $\phi$.

TABLE I

| W | $D_a$ | $D_b$ | B |
|---|---|---|---|
| 1 | 1 | 0 | 1 |
| 1 | 0 | 1 | 0 |
| 1 | 0 | 0 | (1) |
| 0 | ---------- | ---------- | (1) |

1 Retains same state.

To interrogate the memory of FIGURE 2, a tag word consisting of one or more bits is applied to one or more pairs, respectively, of the column wires. $D_a=1$, $D_b=0$ corresponds to interrogating with a 1 tag bit; $D_a=0$, $D_b=1$ corresponds to interrogating with a 0 tag bit; $D_a=0$, $D_b=0$ corresponds to a $\phi$ or don't care tag bit.

There may be no or one, or more than one word in the memory which corresponds to the tag word. In the case of one word in the memory corresponding to the tag word, all memory elements in the row in which the "matching" word is stored will produce outputs $X=0$. These outputs are applied through a logic network for that row, such as network 22–1, to certain gates for that row, such as gates 24–1. A typical network 22 is shown within dashed block 22 of FIGURE 4 and a typical network 24 is shown within dashed block 24 of FIGURE 5. These figures are discussed in detail shortly.

When there is a single word in the memory corresponding to the tag word, the network 24 associated with the row containing the "matching" word applies a signal to a flip-flop in register 28. The flip-flops making up this register, known colloquially as "match" flip-flops, are normally in a reset condition. When a flip-flop receives a certain signal from a stage such as 24–1 it becomes set.

To summarize what has been said so far, if there is one word in the memory associated with a tag word, a flip-flop in the register 28 for that word becomes set. Also, as in the prior art system already discussed, if there is more than one word in the memory corresponding to the tag word, more than one flip-flop in the register 28 becomes set.

The selector circuits 30 produce outputs $LM=1$, in sequence, each $LM=1$ output corresponding to a different set flip-flop. For example, if the flip-flops for rows 1 and 2 are set, the selector circuits first apply an output signal $LM=1$ to gates 24–1. Then, after a set of events to be described, these events including the readout of the word stored, for example, in row 1, and the resetting of the flip-flop for row 1, the selector circuits apply an output signal $LM_2=1$ to the gates 24–2.

When a particular group of gates 24 receives a signal LM, it applies the signal K to its gates 26. If a read control signal is present at the same time, the gates 26 apply a read signal $R=1$ to the memory stages of its row. Upon receipt of such a signal, these stages apply sense signals $S_1$, $S_2$, $S_3$ and $S_4$ to the sense amplifiers 32. These sense signals are indicative of the bits making up the matching word. Each time a write signal $R=1$ is generated, OR gate 34 is enabled and applies a strobe signal ST to the sense amplifiers permitting these sense amplifiers to amplify the sense signals.

Although the memory illustrated in FIGURE 2 differs in structure from those of the copending applications, the method discussed above which is employed for resolving "matches" or "multiple matches" is similar to that used previously. However, as mentioned in the introduction, the present invention is also concerned with a different problem known in the art as "proximity match." This is the problem of determining, in the case in which there is no word in the memory corresponding to the tag word, the word or words which almost match the tag word.

In the present system, if a tag bit applied to a column of the memory does not correspond to a bit stored in a particular memory element in that column, that memory element produces an output $X=1$. For example, if the memory stage 1—1 is storing a 1 and the tag bit for the first pair of column wires is a 0 ($D_{a1}=0$, $D_{1b}=1$) $X_1$ will be a 1. The network 22–1 for row 1, under these conditions, does not produce an output indicative of a "match" and the flip-flop associated with row 1 and located in register 28 remains in its reset position.

Upon receipt of a P signal, as discussed later, the network 22–1 can determine whether 1 or 2 or 3 or 4 tag bits do not correspond with stored bits. Suppose, for example, that the tag word has 4 bits and 3 of these bits correspond with stored bits and one of them does not. Upon receipt of a signal $P_1=1$ the network 22–1 will produce an output $M_1=1$ indicating that three of the four tag bits correspond to stored bits and one bit does not. In response to this signal $P_1=1$ and the resulting signal $M_1=1$ which is generated, the gates 24–1 cause a flip-flop in register 28 to be set. The selector circuits 30, in response to the set signal, apply an output $LM_1=1$ to the gates 24 and the gates 24 thereupon apply a signal $K_1=1$ to the gates 26–1. The gates 26–1 in response to this signal and a read control signal threupon cause the word stored in row 1 to be read out, even though this word does not exactly match the tag word. These various circuits are discussed in detail later.

Figure 3:
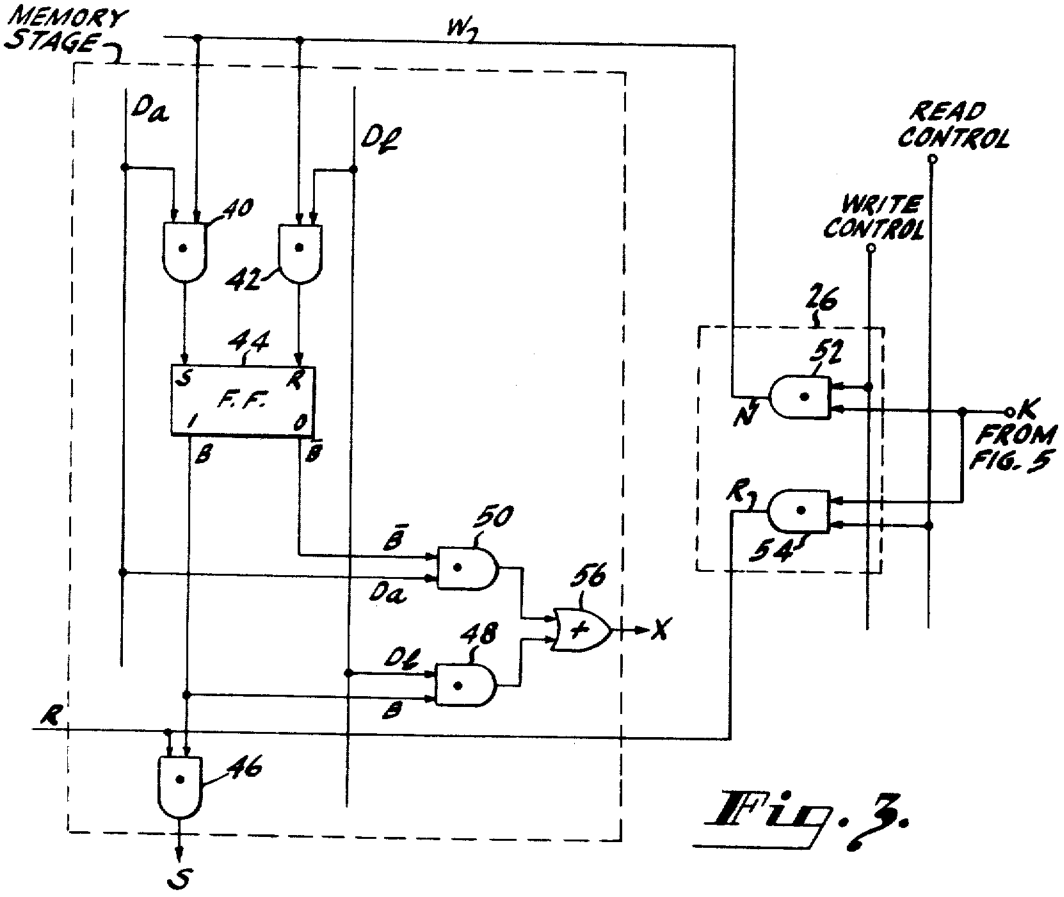
FIGURE 3 is a block circuit diagram showing, in greater detail, some of the circuits in FIGURE 1.

FIGURE 3 shows the details of a memory stage. Each such stage includes two AND gates 40 and 42, gate 40 supplying its output to the set terminal S of a flip-flop 44 and gate 42 supplying its output to the reset terminal R of the flip-flop 44. The B output of flip-flop 44 is applied to one input of AND gates 46 and 48. The $\overline{B}$ output of flip-flop 44 is applied to one input of AND gate 50. The write signal W is one input to AND gates 40 and 42. The second input to AND gates 42 and 48 is the tag signal $D_b$, and the second input to AND gates 40 and 50 is the tag signal $D_a$. The read signal R serves as a second input to AND gate 46.

The write signal W is generated by AND gate 52 and the read signal R is generated by AND gate 54. One input to both AND gates 52 and 54 is the signal K which comes from the circuit of FIGURE 5. The second input to AND gate 52 is the write control signal and the second input to AND gate 54 is the read control signal.

The X signal is produced by OR gate 56. This OR gate receives as inputs the outputs of AND gates 48 and 50. The sense signal S is produced by AND gate 46.

When K is a 1, information may be written into a storage location. The write control input is made a 1 thereby enabling AND gate 52 and W becomes 1. If now $D_a$ is made 1 and $D_b$ is made 0, AND gate 40 becomes enabled and flip-flop 44 is set. In its set condition, the flip-flop stores a 1, that is, $B=1$ and $\overline{B}=0$. In a similar manner, when W is a 1, a 0 may be written into the flip-flop 44 by making $D_b=1$ and $D_a=0$. As $D_b$ and W are both 1, AND gate 42 becomes enabled and flip-flop 44 becomes reset. In the reset condition of the flip-flop, $B=0$ and $\overline{B}=1$.

The memory element of FIGURE 3 may be interrogated by applying signals indicative of tag bits to the pair of columnn wires $D_a$, $D_b$, Asume that the memory element, flip-flop 44, is storing a 1 and that the tag bit is a 1, that is, $D_a=1$, $D_b=0$. Under these conditions, $\overline{B}=0$ and $D_a=1$ so that AND gate 50 is disabled. $B=1$ and $D_b=0$ so that AND gate 48 is disabled. Accordingly, the two inputs to OR gate 56 are both 0 and $X=0$. It can be shown that in any case in which the tag bit corresponds to the stored bit (the "match" condition) $X=0$. In a similar manner, when the interrogating bit is a $\phi$ (don't care) that is, when $D_a=D_b=0$ AND gates 48 and 50 are both disabled and $X=0$.

When the tag bit does not "match" the stored bit $X=1$. For example, if the tag bit is a 1 ($D_a=1$, $D_b=0$) and the stored bit is a 0 ($B=0$, $\overline{B}=1$) then AND gate 50 becomes enabled and $X=1$.

After the X signal has been generated and processed there may be a signal K generated by certain other networks, as discussed previously. If now the read control signal is present, AND gate 54 is enabled and the $R=1$ output primes AND gate 46. Now the bit stored in flip-flop 44 may be read out through the AND gate 46. For example, when $B=1$, the output of AND gate 46 is $S=1$. When $B=0$ the output of AND gate 46 is $S=0$. This S output and the corresponding S outputs for all other memory elements in the same column are "OR'ed" together and applied to a sense amplifier in block 32 of FIGURE 2. The OR function may be simulated by connecting the outputs of all AND gates 46 in a particular column to a common lead.

Figure 4:
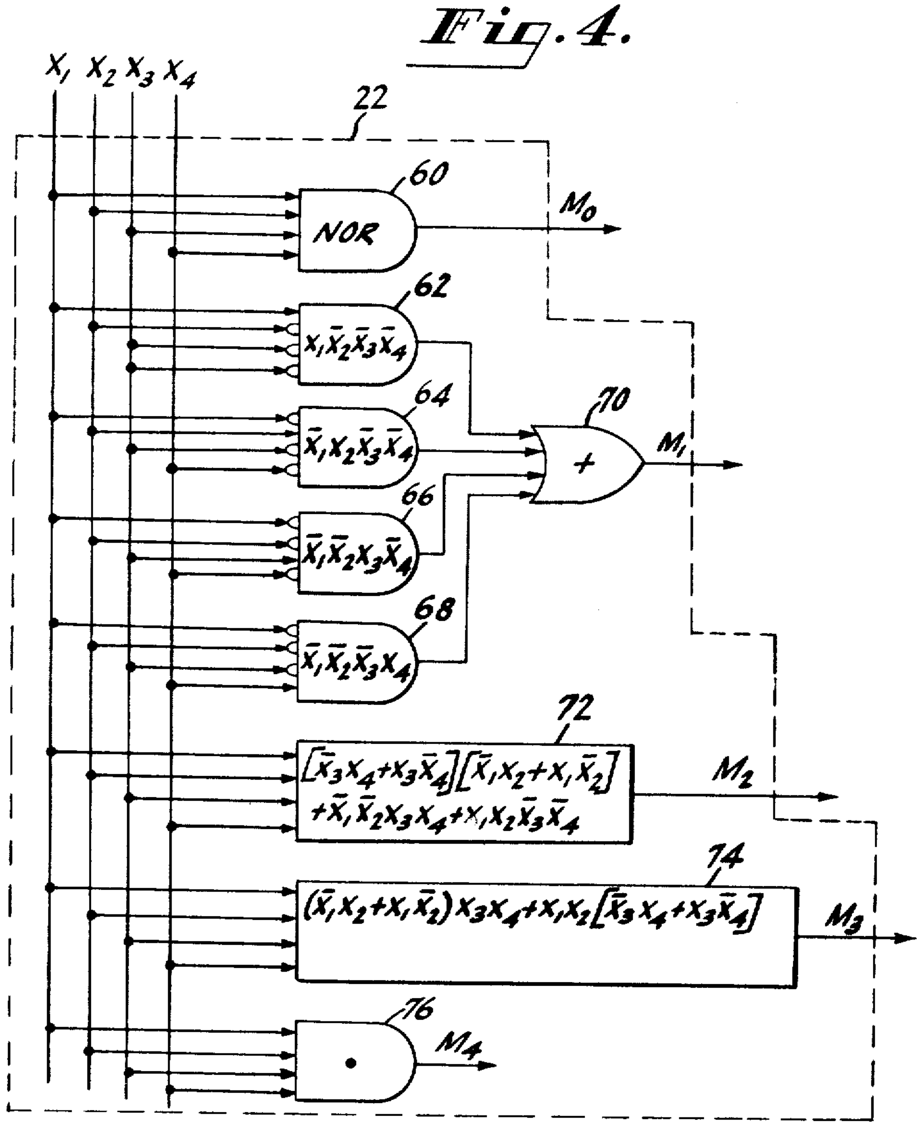
FIGURES 4 and 5 are block circuit diagrams showing, in greater detail, other of the circuits in FIGURE 1.

A typical network 22 of FIGURE 2 is shown in FIGURE 4. There is one such network for each row in the memory and this network receives the X bits generated in the memory stages in its row. The network may include a NOR gate 60, a plurality of logic gates 62, 64, 66 and 68, all of which feed an OR gate 70 and other logic stages 72, 74, 76.

The function of NOR gate 60 is to produce an $M_0=1$ output when a stored word corresponds to the tag word. It will be recalled that under these conditions all of the X bits are 0 and NOR gate 60 does produce an $M_0=1$ output when all of its inputs are 0.

The gates 62, 64, 66 and 68 are all AND gates, each with 3 inhibit inputs, designated by half circles. AND gate 62 produces an output when $X_1=1$ and all other bits are 0. The other gates function in a similar manner, as indicated by the Boolean expression within each gate. The overall function performed by the network 62–70 is to produce an output $M_1=1$ when exactly one of the four X bits is a 1.

The construction of network 72 should be self-evident from the logic equations within block 72. These equations define all of the conditions under which exactly 2 of the 4 X bits are 1. There are many different ways the network can be implemented. For example, the first term within the brackets is the EXCLUSIVE OR function and it can be implemented by a single EXCLUSIVE OR gate with inputs $X_3$ and $X_4$. The second term within the brackets can be implemented in a similar fashion, that is, by an EXCLUSIVE OR gate with inputs $X_1$ and $X_2$. The complete first and second terms within brackets therefore can be implemented by two EXCLUSIVE OR gates, one receiving inputs $X_3$ and $X_4$ and the other receiving inputs $X_1$ and $X_2$ and the outputs of these two gates being applied to an AND gate. The next term of the equation $\overline{X}_1\,\overline{X}_2\,X_3\,X_4$ can be implemented by an AND gate with two inhibit inputs and the last term $X_1\,X_2\,\overline{X}_3\,\overline{X}_4$ can be implemented in similar fashion. The complete equation is implemented by connecting the three AND gates to an OR gate. As already mentioned, the network 72 produces an output $M_2=1$ when exactly two of the X bits are 1.

The Boolean equation within block 74 defines the structure of this network. The equation describes the values of the inputs which are required to produce an $M_3=1$ output when exactly 3 of the inputs are 1. The practical implementation of the network is straightforward.

The last gate 76 is an AND gate and its output $M_4$ is 1 when all 4 of the inputs are 1.

Figure 5:
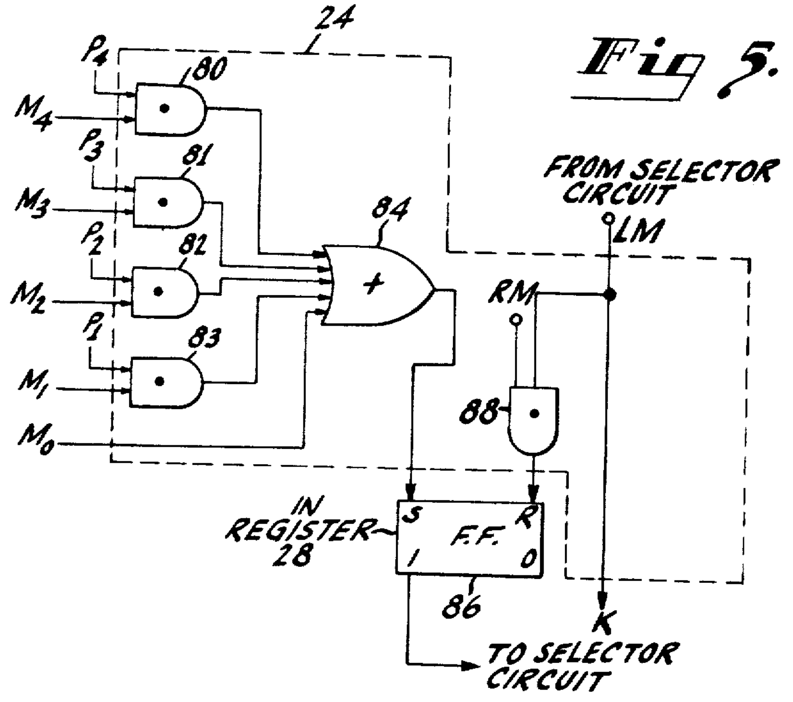

The network of FIGURE 4 applies its outputs to the network of FIGURE 5. The latter includes 4 AND gates 80, 81, 82, 83 connected to an OR gate 84. The OR gate output is applied to the set terminal of flip-flop 86. This flip-flop is within the register 28. The fifth AND gate 88 in the network is connected to the reset terminal of flip-flop 86 and it receives as inputs the signals LM and RM. The signal LM is produced by the selector circuits 30 of FIGURE 1. The signal RM is a timing pulse which is generated when it is desired to reset the flip-flop 86.

The operation of the network of FIGURE 5 will be discussed under a number of different assumed conditions. First, assume that the tag word corresponds to a stored word in a particular row. In this case, all of the X signals generated by this row will be 0 and the network 22 of FIGURE 4 associated with that particular row will produce an output $M_0=1$. The network 24 for that same row therefore receives $M_0=1$ and OR gate 84 will produce a 1 output. This 1 sets the flip-flop 86 associated with the row and the flip-flop applies a 1 to the selector circuits. The selector circuits in addition may receive 1's from other flip-flops. As already mentioned, the function of the selector circuits is to generate successive LM signals and apply them in a particular order to the networks 24 associated with the different set flip-flops.

Assume now that the signal LM has arrived. This signal $LM=K$ is applied to the network 26 (see FIGURE 2). A read control signal may now be applied to that network 26 and the word stored in the particular row of the memory read out. After the word has been read out, the timing circuits for the system generate a signal $RM=1$ (reset match flip-flop), whereby AND gate 88 becomes enabled and the flip-flop 86 becomes reset. Thereupon, the particular signal LM is removed and another signal LM for network 24 associated with another set flip-flop in register 28 may be generated.

Assume now that there is no word in the memory corresponding to the tag word and it is desired to determine whether there is any word in the memory which has only one bit which does not match a tag bit. It will be recalled that under this set of conditions, the signal $M_1$ for a particular row will be 1 and $M_0$ will be 0. If now the interrogating bit $P_1=1$ is applied, AND gate 83 of FIGURE 5 is enabled and the flip-flop 86 becomes set. Thereafter, following the same steps as previously, the stored word which has only one mismatching bit will be read out.

If there is more than one word in the memory having only one mismatched bit, they can be read out, in sequence, in the same manner as already discussed for "multiple matches." Each row in the memory which generates an $M_1=1$ signal, sets a flip-flop in register 28 of FIGURE 2 when the $P_1=1$ signal is applied. The selector circuits 30 of FIGURE 2 generate the required successive $LM=1$ signals to permit these stored words to be read out in sequence.

If desired, the word or words in the memory with greater degrees of mismatch, with respect to the tag word also may be read out of the memory. The signal $P_2=1$ applied concurrently with the tag bits permits the words with two non-matching bits to be read out. The signal $P_3=1$ applied concurrently with the tag bits permits the words with three non-matching bits to be read out, and so on.

Figure 6:
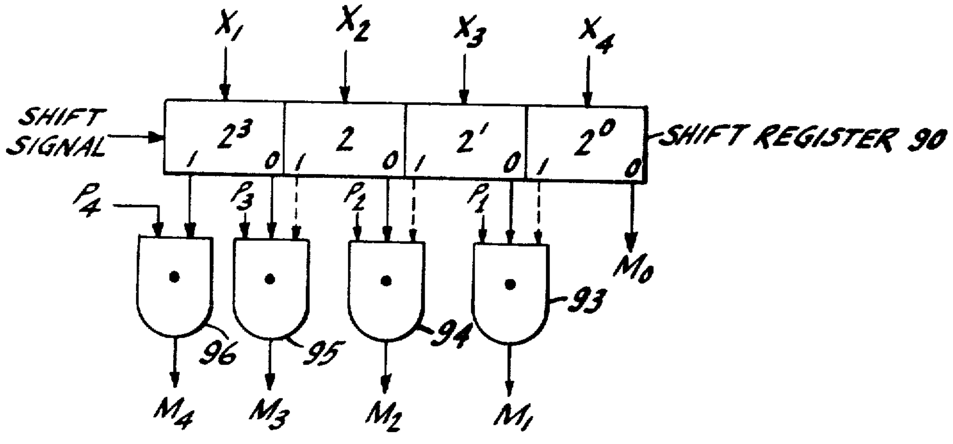
FIGURE 6 is a block circuit diagram of a modified circuit according to the invention.

While the invention has been illustrated in terms of networks of logic elements for deriving from each X control word, control signals indicative of the number of mismatching bits in the corresponding stored word, other means are possible for achieving the same end. As one example, each X word may be applied in parallel to a shift register such as 90 in FIGURE 6. In the case of the specific memory illustrated in FIGURE 2, each shift register has 4 stages and the $X_4$ bit is applied to the $2^0$ stage, the $X_3$ to the $2^1$ stage and so on. Thereafter, 4 successive shift signals are applied to the shift register. In the case of one 1 in the X word, this 1 is shifted to the $2^0$ stage regardless of its original position. In the case of two 1's in the X word, these 1's are shifted to the $2^1$ and $2^0$ stages, regardless of their original positions, and so on.

After the shifting operation above, the bit stored at the $2^0$ stage of each shift register is sensed. If the bit is a 0 it indicates that the word stored in the row corresponding to the particular shift register matches the tag word. If the $2^1$ bit stored in the shift register is a 0 and the $2^0$ bit is a 1, this indicates that there is one mismatching bit in the corresponding stored word. The $2^2$ bit stored in shift register is a 0 and the bits of lesser significance are all 1's, this indicates that there are two mismatching bits in the corresponding stored word, and so on. Accordingly, the information stored in each shift register is indicative of whether the corresponding word matches or mismatches a tag word and, in the case of the mismatch condition, the amount of mis-match.

The control signals may be derived from the shift register by straightforward means. An AND gate may be connected to each stage except the $2^0$ stage of the shift register, these AND gates being maintained disabled. If the $2^0$ stage stores a 0 after the shifting operation, this indicates a match and $M_0=1$, just as in the case of FIGURE 4.

If $M_0=0$ this indicates a mis-matched condition. In this case, if the $2^1$ stage of the shift register stores a 0 after the shifting operation, this means that there is only one bit in the stored word which does not match a tag word. A $P_1=1$ signal applied to AND gate 93, under these conditions, produces an $M_1=1$ output thereby indicating one mis-matched bit just as in the circuit of FIGURE 4. In a similar manner, if after the shifting operation and the application of $P_1$, $M_1$ and $M_0$ are both 0 and $P_2=1$ applied to AND gate 94 results in an $M_2=1$ output, then there are two mis-matched bits in a stored word. AND gates 95 and 96 operate in similar fashion.

In the arrangements as described above, it is desirable to "look at" $M_0$, $M_1$ . . . $M_3$, in sequence, to be certain of the number of mis-matching bits. For example, if the signal $P_2=1$ causes a 1 output, unless one knows that $M_1=0$, and $M_0=0$, one cannot be certain than the $2^0$ and $2^1$ bits are both 1. However, it the leads shown by dashed lines are added, then it is not necessary to do this. In this case, for example, an output $M_1=1$ after a shifting operation and the application of a $P=1$ signal indicates that there are three 0's and one 1 in the X word. An output $M_2=1$, under the same conditions, in response to a $P_2=1$ signal, indicates that there are two 0's and two 1's in the X word.

A brief final word may be in order concerning the method by which information may be written into the content-addressed memory. As an example, to write into rows in the memory which have no information stored (all stored bits are 0), first a tag word consisting of all 0's is applied to the memory. Under this set of conditions, the flip-flops in register 28 corresponding to the empty rows (all stored bits are zero) will become set. The selector circuits 30 will then select the first empty row and the world desired to be written into this empty row can be applied to the column wires in the presence of the write control signal. Information can also be written into part of a row in very similar fashion. For example, suppose one knows the first three bits of stored information and wishes to change the value of the fourth bit. To do this, a tag word is applied which consists of the 3 known bits and this causes the flip-flop associated with the particular stored word to become set. The selector circuits and write control signal thereupon cause the write signal W, for that row, to be generated. Thereupon, the fourth bit may be written into the row by applying this bit to the pair of column wires leading to the storage location for the fourth bit.

What is claimed is:

1. A system for interrogating a content-addressed memory having a plurality of word storage locations comprising, in combination:
- means for applying a tag word to the memory;
- means for deriving from each word storage location a control word consisting of a bit of one value for each bit in a stored word which is not equal to the corresponding tag bit and a bit of the other value for each other bit of the stored word;
- means receptive of the control words for producing control signals indicative of the control words having a predetermined number greater than zero of bits of said one value; and
- means responsive to said control signals for reading out, in sequence, the stored words from which control words having said predetermined number of bits of said one value are derived.

2. A system as set forth in claim 1, further including means receptive of the control words for producing control signals indicative of the control words having all bits of said other value; and
- means responsive to the last-named means for reading out, in sequence, the words in said memory which "match" said tag word.

3. In combination:
- a content-addressed memory having a plurality of pairs of columns and a plurality of rows, and which stores words along said rows;
- means for applying a tag word to columns of the memory which may include no, one, or more zeros, no, one or more ones, and no, one or more $\phi$'s, where $\phi$ represents "don't care";
- means for deriving from each row of the memory a control word consisting of a bit of one value for each stored bit which is not equal to the corresponding tag bit, and a bit of other value for each stored bit which either is equal to the corresponding tag bit or which corresponds to a $\phi$ tag bit;
- means for deriving from each control word having a desired number greater than zero of bits of said one value a control signal; and
- means responsive to each control signal for reading out a word stored in the memory from which a control word having said predetermined number of bits of said one value is derived.

4. A memory interrogation system comprising, in combination:
- a memory storing the respective bits of a plurality of data words;
- means for applying to said memory a tag word;
- means for comparing the bits of the tag word with the corresponding bits of all of the words in said memory and producing a plurality of digital manifestations, one for each word in said memory, each said manifestation indicating the degree of match of a word in said memory to said tag word; and means responsive to said digital manifestations for reading out from said memory the words corresponding to a desired degree of match, less than 100°, between the tag word and the words in said memory.

5. A memory interrogation system comprising, in comnation:

a memory storing the respective bits of a plurality of data words;

means for applying to said memory a tag word;

means for comparing the bits of the tag word with the corresponding bits of all of the words in said memory and producing a digital manifestation, for each word in said memory, indicative of the degree of match of that word to the tag word;

means for producing a control signal indicative of degree of match desired, between the tag word and the words in said memory, where said degree of match desired can be less than 100%; and means responsive to said control signal and to said digital manifestations for reading out from said memory the words corresponding to said desired degree of match between the tag word and the words in said memory.

6. In combination:

a content-addressed memory;

means for applying a tag word to said memory;

means for deriving from each word location in said memory a digital manifestation of the degree of match of the word at that location with said tag word; and means responsive to said digital manifestations for reading out, in sequence, the words in said memory corresponding to a desired degree of match, less than 100%, between said tag word and said words in said memory, without changing the value of said tag word.

References Cited

UNITED STATES PATENTS

| | | | |
|---|---|---|---|
| 3,031,650 | 4/1962 | Koerner | 340—172.5 |
| 3,195,109 | 7/1965 | Behnke | 340—172.5 |
| 3,221,158 | 11/1965 | Roth et al. | 340—172.5 X |
| 3,221,308 | 11/1965 | Peterson et al. | 340—172.5 |
| 3,261,000 | 7/1966 | Behnke | 340—172.5 |
| 3,264,616 | 8/1966 | Lindquist | 340—172.5 |
| 3,284,775 | 11/1966 | Koerner et al. | 340—172.5 |

PAUL J. HENON, *Primary Examiner.*